United States Patent Office 2,708,451
Patented May 17, 1955

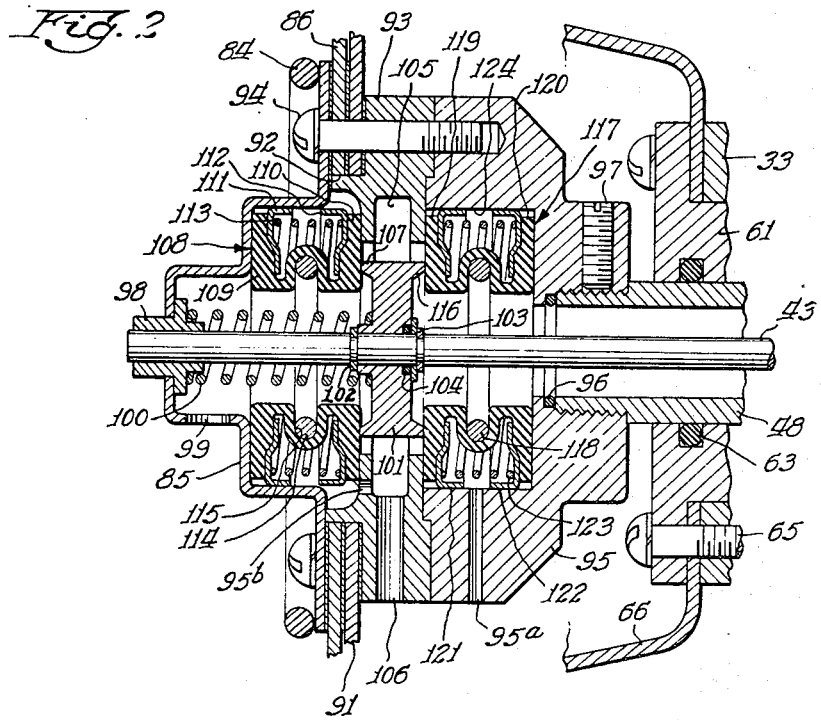
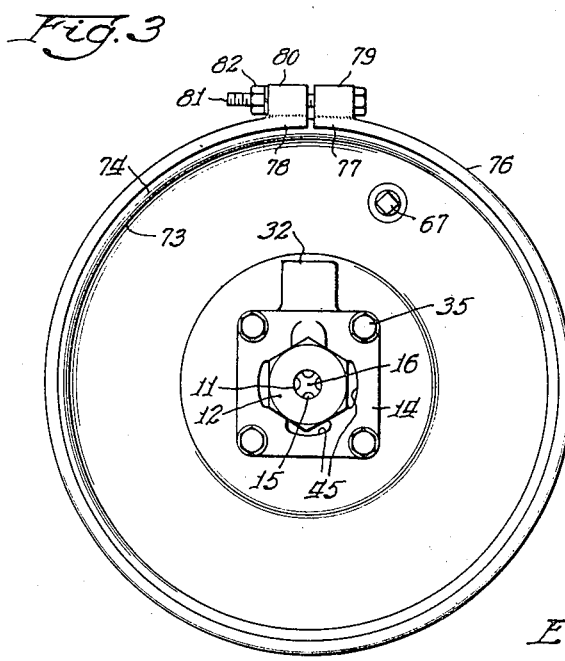

2,708,451
GROMMET VALVE MEANS

Edward A. Rockwell, Los Angeles, Calif.

Application June 7, 1952, Serial No. 292,234

10 Claims. (Cl. 137—620)

My invention relates particularly to valve means which is applicable to any desired purpose but which may have special application for use in connection with applying power, as for instance in the operation of accessories on automobiles, airplanes, etc.

This application is a division of my copending application upon Tandem Power Unit for Applying Hydraulic Pressure, Ser. No. 611,985, filed August 22, 1945, now Patent No. 2,603,985.

An object of my invention is to provide an effective valve means which may be in the form of a grommet. Another object is to provide a simplified valve mechanism useful in this connection for controlling the application of a fluid pressure, as for example to a movable wall which is operated thereby for placing a hydraulic liquid under pressure. A further object is to provide a valve-operating stem which may pass through a hydraulic power plunger for producing the said hydraulic pressure. Further objects of my invention will appear from the detailed description of the same hereinafter.

While my invention is capable of embodiment in many different forms, for the purpose of illustration I have shown only one form thereof in the accompanying drawings, in which—

Fig. 2 is an enlarged section of the valve mechanism for said power unit; and

Fig. 3 is an end elevation of the power unit as viewed from the right in Fig. 1.

Figure 1:
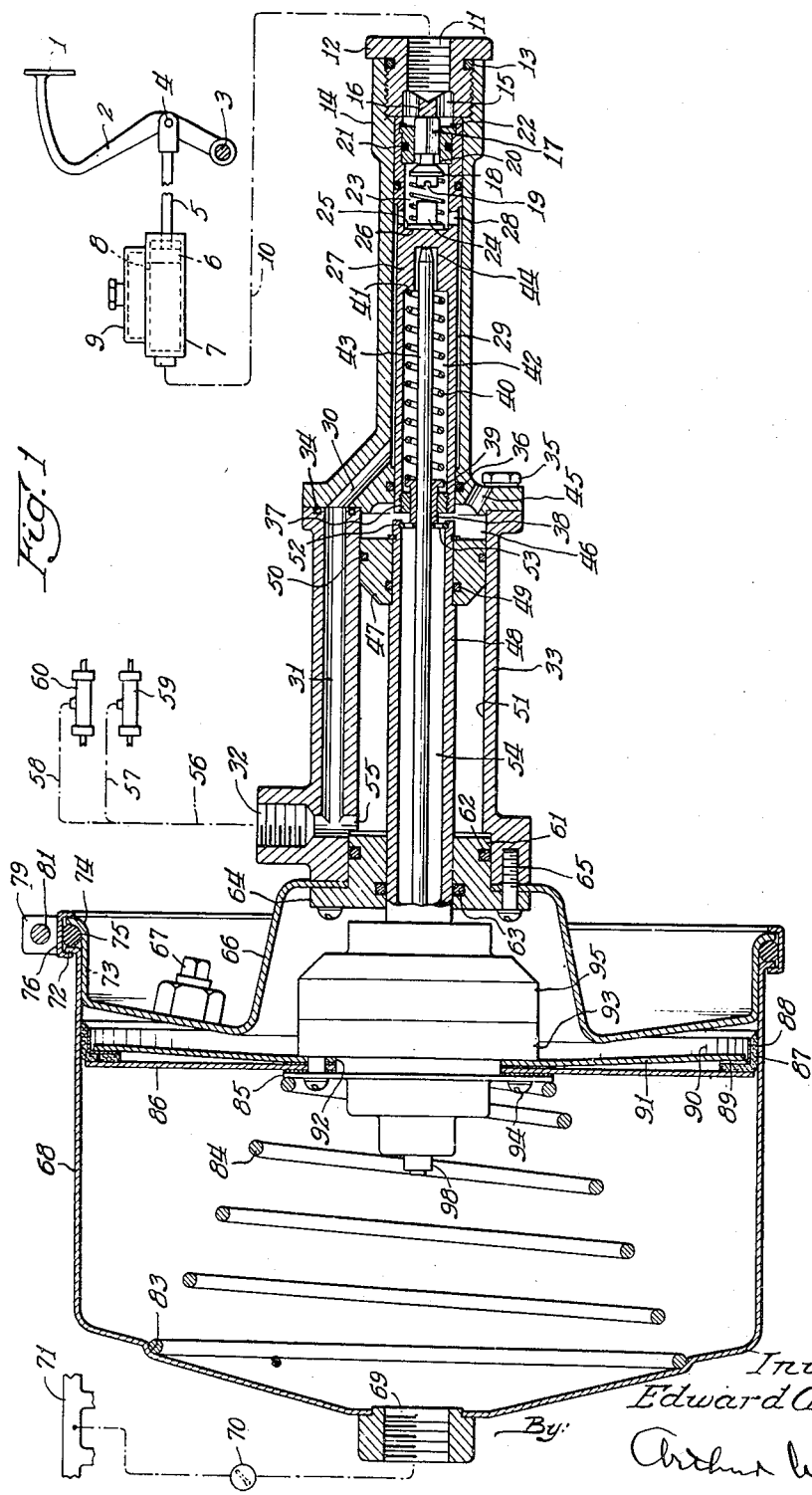
Fig. 1 is a vertical section of a power unit containing a valve made in accordance with my invention.

In the drawings, I have shown a pedal 1 mounted on a pedal lever 2 carried by a fixed pivot 3 on the chassis of an automobile, the same being connected by a pivot 4 to a piston rod or link 5 which is connected to a piston 6 in a master cylinder 7 which has a port 8 leading to a master cylinder reservoir 9 in the usual way. A pipe 10 leads from the master cylinder 7 to an inlet 11 in a screw plug 12, having a seal 13, screw-threaded into a cylinder 14. The screw plug 12, furthermore, has four semi-cylindrical holes 15 bored in the inner end of the same so as to leave a central portion 16 to act as a valve stop. The stop 16 cooperates with a squared stem 17 having on its inner end a tapered valve 18 having a screw-driver slot 19. Said valve 18 is normally pressed towards the right in the direction of its position against a valve seat member 20, which member has a seal 21 and is held in place by a split ring 22, by means of a helical spring 23 carried on a removable pin 24 having a flange 25 which seats in a recess 26 in the end of a manually operable plunger 27, in which the valve seat member 20 and the split ring 22 are carried. Radial ports 28 are located in the manual plunger 27 to permit the passage of hydraulic liquid past the valve 18, 20, and thence into an annular space 29 around the manual plunger 27 which communicates with an inclined passageway 30 leading to a longitudinal passageway 31 and thence to a delivery port 32 in a power plunger cylinder or casing 33. An annular seal 34 is located between the passageways 30 and 31, and the cylinder 14 is secured to the casing 33 by means of screws 35. The plunger 27, furthermore, passes through an annular seal 36 and at its left hand end is provided with a screw-threaded annular bushing 37, in the interior of which there is a sleeve 38 having a flange 39 to provide a support for a helical spring 40, the other end of which rests against a shoulder 41 in a cylindrical chamber 42 inside the manual plunger 27. Furthermore, a valve-operating rod 43 passes through the bushing 38 and thence through the chamber 42 and into a cylindrical recess 44 so that the end of the rod 43 abuts against the end of the said recess 44. A plurality of air ports 45 lead from the outer air to an annular chamber 46, in the casing 33, which is formed by the presence of a piston 47 fastened on a power plunger 48, said piston having an inner seal 49 and an outer seal 50, the latter being in contact with the face of a power cylinder 51 and the interior of the casing 33. Furthermore, at the extreme right hand end of the power plunger 48 there is an apertured washer 52 having a series of holes 53 to permit the entry of the air from the annular chamber 46 to a longitudinal passageway 54 located in the power plunger 48. It will be noted that the cylinder 51 has a passageway 55 leading therefrom to the longitudinal passageway 31 and thence by the delivery port 32 from which the liquid placed under pressure by the piston 47 will be delivered through a hydraulic pipe having branch pipes 57 and 58 which lead, respectively, to front and rear wheel cylinders 59 and 60, carrying pistons in the usual way for the operation of the brake shoes in cooperation with the brake drums (not shown).

In the left hand end of the casing 33 there is a bushing 61 having an external seal 62 and an internal seal 63. The bushing 61 has a flange 64 through which a series of screws 65 pass to clamp between the flange 64 and the casing 33, an end plate 66, U-shaped in cross-section, which is provided with a screw plug 67 for a trailer connection, when desired, or for testing purposes or for introducing oil to the interior of a cylinder 68, which has an opening 69 for connection to any suitable source of vacuum, as by a check valved pipe 70 to a manifold 71 of an internal combustion engine of the automobile on which the power unit herein described is mounted, for driving the automobile. The cylinder 68 has an annular flange 72 which is located over a cylindrical flange 73 on the periphery of the end plate 66, which has an outwardly directed flange 74 for clamping a cylindrical seal 75 against the flange 72 by means of a circular channel member 76, which has two ends 77 and 78 carrying sleeves 79 and 80, respectively, that are forced together by a bolt 81 having on its end a nut 82. The cylinder 68, furthermore, has a circular recess 83 for supporting one end of a conically shaped spring 84, the smaller end of which is supported against a valve casing shell 85 located on a movable wall, in the form of a piston head 86 which has at its periphery a leather gasket 87 fitted against the inside of the cylinder 68, retained in place by a spring ring 88, L-shaped in cross-section, and which has longitudinal alternating cuts 89 and 90 therein extended from the opposing sides of said ring 88. The ring 88 is held against the leather gasket 87 by means of a spring disc 91. The movable wall 86 and the spring disc 91 are both supported within a recess 92 on a valve casing member 93 to which they are fastened by means of screws 94 which extend, also, through the valve casing shell 85 and are screw-threaded into a valve casing 95, which has a seal 96, screw-threaded on the end of the power plunger 48, where it is held in place by a lock screw 97.

The left hand end of the valve rod 43 is slidably supported within a small bushing 98 fastened in the end of the valve casing shell 85, which is in communication by means of a port 99 to the interior of the cylinder 68.

The bushing 98, furthermore, supports one end of a helical spring 100, the other end of which rests against one side of an annular valve member 101 which is held in place on the valve rod 43 by means of split rings 102 and 103 and sealed on said rod by means of a seal 104. The valve member 101 is located in a centrally arranged chamber 105 in the valve casing member 93, said chamber 105 being connected by a passageway 106 to the right face of the movable wall 86. Furthermore, the said annular valve element 101 has a laterally directed annular flange 107 which forms a valve seat for a grommet vacuum valve 108, made of rubber, and which is supported in the valve casing shell 85. The vacuum valve 108 is, furthermore, provided with two circular outer flanges 109 and 110, on the inner faces of which there are provided spring supporting rings 111 and 112 for supporting the ends of a helical spring 113, which normally presses the two flanges 109 and 110 away from each other and against the valve casing shell 85 and the valve casing member 93, respectively. A ring 114 occupies a circular inner recess 115 in the rubber vacuum valve 108 to hold the same outwardly towards the periphery of the valve casing member 93.

On the other side of the valve element 101 there is, furthermore, provided an annular flange 116 which cooperates with a grommet air valve 117, made of rubber, that is constructed just the same as the grommet vacuum valve 108, having a ring 118 for pressing it outwardly, also outwardly directed circular flanges 119 and 120 against which there are located spring-retaining rings 121 and 122 for supporting between them a helical spring 123. The grommet air valve 117 is located within a chamber 124 formed in the valve casing 95. The valve casing 95 has a venting port 95a for the grommet air valve 117 leading to the space between the movable wall 86 and the end plate 66. There is also a similar port 95b for venting the grommet vacuum valve 108.

It will be apparent from the foregoing description that when the pedal 1 is in fully released position and the power unit is inoperative the valve rod 43 is normally urged to the right by the reaction of the spring 100 at one end against the bushing 98, fastened to the valve casing shell 85 secured to the wall 86, and at the other end against the valve element 101 to thereby urge the valve element 101, secured to the rod 43, to the right to unseat the flange 107 of the valve element 101 from the flange 110 of the grommet vacuum valve 108 and to seat the flange 116 of the valve element 101 on the flange 119 of the air valve 117 to thereby permit a vacuum connection from the left side of the wall 86 to port 99, chamber 105 and passageway 106 to the right side of the wall 86. Upon initial slight movement of the rod 43 to the left by the plunger 27, as hereinafter described, against the action of the spring 100, the valve element 101 will also be moved in the same direction to close the valve 107, 110 to interrupt the vacuum connection, the slight movement of the rod 43 and valve element 101 being ineffective to open valve 116, 119, this stage of operation being shown in Fig. 2 wherein the valves 107, 110 and 116, 119 are illustrated in their lapped positions. Upon further movement of the rod 43 to the left by the plunger 27, as hereinafter described, and thereby the valve element 101 the flange 116 of the valve element 101 will be unseated from the flange 119 of the grommet air valve 117 to permit the flow of air from the chamber 54 to the plunger 48 through the chamber 105 and passageway 106 to the right side of the wall 86 to effect movement of the wall 86 and rod 43 to the left as well as the piston 47 which places the liquid under pressure in the cylinder 51.

In the operation of my invention, it being assumed that there is a vacuum received by the power unit from the manifold 71 by means of the pipe 70 into the interior of the cylinder 68, when it is desired to apply the brakes, manual pressure is applied to the pedal 1 which, accordingly, moves the master cylinder piston 6 to close the liquid compensation port 8 and thereby convey the hydraulic liquid under manual pressure to the opening 11 in the power unit. The valve 18 being initially unseated from the valve seat 20 by the square stem 17 located against the stop 16 so as to press the tapered valve to the left against the force of the valve spring 23, the hydraulic fluid from the manual pressure pipe 10 will be conveyed initially past the valve 18, 20, through the ports 28, annular chamber 29, inclined passageway 30 and longitudinal passageway 31 through the delivery port 32 and thence by the pipes 56, 57 and 58 to the front and rear wheel brake cylinders 59 and 60, thus seating the brakes and also providing means whereby, at any time, the manual hydraulic pressure can be applied to the said brakes even when the power from the power unit is not effective for any reason. The said manual hydraulic pressure, however, substantially immediately thereafter, moves the manual plunger 27 to the left, thus moving the squared stem 17 away from the stop 16 and seating the valve 18 on its seat 20, the valve 18, 20 thus acting as a cut-off valve to disconnect the manual pressure liquid from being supplied thereafter from the pipe 10 to the brake cylinders 59 and 60. Continued manual pressure of the hydraulic fluid will thereafter move the manual plunger 27 to the left so that the valve rod 43 is actuated thereby to seat the vacuum valve flange 107 against the flange 110 of the grommet vacuum valve 108. It will be understood that previous to this time the flange 107 will have been normally maintained spaced away from the flange 110 by the spring 100 so that, normally, before the actuation of the plunger 27 the vacuum received in the vacuum port 60 will pass from the left face of the movable wall 86 to the right face thereof by means of the annular chamber 105 and the port 106. As stated above, however, when the flange 107 becomes seated on the flange 110 of the grommet vacuum valve 108 the vacuum connection leading to the right face of the movable wall 86 will thus become interrupted. This stage of the operation of the valve mechanism is shown in Fig. 2 wherein it may be seen that an initial manual hydraulic pressure exerted on the plunger 27 will effect a small movement of the rod 43 and valve element 101 to the left which will in turn cause the flange 107 of the valve element 101 and flange 110 of the valve 108 to assume a lapped position to interrupt the vacuum connection between the chambers on opposite sides of the walls 86 while failing to disrupt the lapped position of the flange 116 of the valve element 101 and flange 119 of the valve 117. After this, upon further manual pressure being exerted by means of the valve rod 43, the flange 116 on the valve element 101 will then become unseated from the flange 119 of the grommet air valve 117, whereas before this time, and even when the power unit is not under manual actuation from the pedal 1, the air valve 116, 119 will have been in closed position. The unseating of the air valve 116, 119 will admit atmospheric air from the inlet port 45 to the annular chamber 46, thence through the holes 53 to the longitudinal passageway 54 in the power plunger 48, and thence through the valve 116, 119 to the right face of the movable wall 86, thus moving the wall 86 to the left and carrying with it the power piston 47 which thereafter places the liquid under pressure, which is increased according to the relative diameters of the wall 86 and the piston 47, so as to deliver the liquid under pressure by the delivery port 32 and the pipes 56, 57 and 58 to the wheel brake cylinders 59 and 60 of the front and rear wheels of the automobile, respectively.

Upon releasing the manual pressure on the pedal 1 slightly and thereby the manual hydraulic pressure acting on the plunger 27 the plunger 27 will be slightly moved to the right by the spring 40 which allows rod 43, in engagement with the plunger 27 and valve element 101, to be moved in the same direction by the action of the spring 100 so that the valve 116, 119 will become seated to close off the admission of air from the chamber 54 of the plunger 48 to the chamber 105 and passageway 106 and to the right side of the piston 86 while the vacuum valve flanges 107 and 110 will remain seated preventing the admission of vacuum to the chamber 105 and to the right side of the piston 86, so as to maintain the particular desired pressure as applied to the wheel brake cylinders 59 and 60. Upon further release of the manual pressure from the pedal 1, however, the manual hydraulic pressure is released on the plunger 27 and the latter will thereupon be moved to the limit of its travel to the right by its spring 40 allowing the rod 43 and valve element 101 to move to the right due to the action of the spring 100 so that the vacuum valve 107, 110 will be opened and, as the valve 116, 119 remains closed, the movable wall 86 will again be submerged in the vacuum which is now present on the both sides thereof. In this way by always maintaining the vacuum on the left face of the movable wall 86 and applying more or less, as desired, of the atmospheric pressure to the right face of the movable wall 86, the desired amount of the braking effort is applied to the wheel cylinders 59 and 60.

While I have described my invention above in detail, I wish it to be understood that many changes may be made therein without departing from the spirit of the same.

I claim:

1. An annular grommet valve of rubber having a rubber supporting flange, a rubber valve flange, spring means pressing said rubber flanges apart by spring pressure and a movable valve element having means fastened together with the valve element for forcing the valve element into and out of contact with the rubber valve flange against said spring pressure.

2. An annular grommet valve of rubber having a rubber supporting flange, a rubber valve flange, spring means pressing said rubber flanges apart by spring pressure, a movable valve element having means fastened together with the valve element for forcing the valve element into and out of contact with the rubber valve flange against said spring pressure, and a ring located inside the inner periphery of the grommet for maintaining its annular form.

3. An annular grommet valve of rubber having a rubber supporting flange, a rubber valve flange, means pressing said rubber flanges apart by spring pressure, a movable valve element having means fastened together with the valve element for forcing the valve element into and out of contact with the rubber valve flange against said spring pressure, another similar grommet valve located with the movable valve element between the two grommets for cooperation therewith, and a valve member forming a chamber around the movable valve element, having an air port and communicating with passages passing through the grommets to the other sides of the grommets.

4. An annular grommet valve of rubber having a rubber supporting flange, a rubber valve flange, spring means pressing said rubber flanges apart by spring pressure and a movable valve element having means fastened together with the valve element for forcing the valve element into and out of contact with the rubber valve flange against said spring pressure, said means including a spring-retaining ring for supporting the spring from a flange.

5. An annular grommet valve of rubber having a rubber supporting flange, a rubber valve flange, spring means pressing said rubber flanges apart by spring pressure, a movable valve element having means fastened together with the valve element for forcing the valve element into and out of contact with the rubber valve flange against said spring pressure, and a ring located inside the grommet for maintaining its annular form, said means including a spring-retaining ring for supporting the spring from a flange.

6. An annular grommet valve of rubber having a rubber supporting flange, a rubber valve flange, helical spring means pressing said rubber flanges apart by spring pressure, a movable valve element having means fastened together with the valve element for forcing the valve element into and out of contact with the rubber valve flange against said spring pressure, and a ring located within the helical spring inside the grommet for maintaining its annular form.

7. An annular grommet valve of rubber having a rubber supporting flange, a rubber valve flange, helical spring means pressing said rubber flanges apart by spring pressure, a movable valve element having means fastened together with the valve element for forcing the valve element into and out of contact with the rubber valve flange against said spring pressure, and a ring located within the helical spring inside the grommet for maintaining its annular form, said means including a ring for supporting the spring from a flange.

8. A circular grommet valve of rubber having a rubber supporting flange, a rubber valve flange acting as a valve element, resilient means for urging said rubber flanges outwardly and a movable valve element having means fastened together with the valve element for forcing the valve element into contact with the rubber valve flange.

9. A valve adapted to be controlled by a movable valve element, having a structure including yielding material in a mechanism adapted for controlling fluid apparatus comprising, a longitudinally yielding flexible annular member provided with an opening therethrough and having a rubber spring-pressed outwardly directed valve flange at one end as well as a ring-supported rubber sealing flange at the other end of said member to control flow of fluid through said opening, and around the outside of the valve flange, by the opening and closing thereof by means of the movable valve element, said rubber flanges and member being molded in one piece of yielding material.

10. A valve adapted to be controlled by a movable valve element having a structure including yielding material in a mechanism adapted for controlling fluid apparatus comprising, a longitudinally yielding flexible annular member provided with an opening therethrough and having a rubber valve having a spring-pressed ring-supported rubber outwardly directed valve flange at one end as well as a ring-supported rubber outwardly directed sealing flange at the other end of said member to control flow of fluid through said opening, and around the outside of the valve flange, by the opening and closing thereof by means of the movable valve element, said rubber flanges and member being molded in one piece of yielding material, a single helical spring being provided to exert pressure upon both said flanges, which are retained in position by both said flange-supporting rings.

References Cited in the file of this patent

UNITED STATES PATENTS

| | | |
|---|---|---|
| 1,770,193 | Bragg | July 8, 1930 |
| 1,871,299 | Bragg et al. | Aug. 9, 1932 |
| 2,366,520 | Griffith | Jan. 2, 1945 |
| 2,614,874 | Helffecht | Oct. 21, 1952 |